US006856800B1

(12) United States Patent
Henry et al.

(10) Patent No.: US 6,856,800 B1
(45) Date of Patent: Feb. 15, 2005

(54) FAST AUTHENTICATION AND ACCESS CONTROL SYSTEM FOR MOBILE NETWORKING

(75) Inventors: Paul Shala Henry, Holmdel, NJ (US); Zhimei Jiang, Eatontown, NJ (US); Hui Luo, Marlboro, NJ (US)

(73) Assignee: AT&T Corp., New York, NY (US)

( * ) Notice: Subject to any disclaimer, the term of this patent is extended or adjusted under 35 U.S.C. 154(b) by 442 days.

(21) Appl. No.: 10/145,301

(22) Filed: May 14, 2002

Related U.S. Application Data

(60) Provisional application No. 60/290,776, filed on May 14, 2001.

(51) Int. Cl.[7] ............................. H04M 1/66; H04Q 7/20
(52) U.S. Cl. ................... 455/411; 455/410; 455/432.1; 455/435.1; 455/434; 380/247; 380/248
(58) Field of Search ................................ 455/410, 411, 455/422.1, 432.1, 435.1, 434, 515, 550, 558, 426.1; 379/142.05, 145, 189; 380/247, 248; 709/219, 229

(56) References Cited

U.S. PATENT DOCUMENTS

| 6,075,860 | A | * | 6/2000 | Ketcham | 713/159 |
| 6,198,823 | B1 | * | 3/2001 | Mills | 380/247 |
| 6,236,852 | B1 | * | 5/2001 | Veerasamy et al. | 455/411 |
| 6,490,445 | B1 | * | 12/2002 | Holmes | 455/419 |
| 2002/0042820 | A1 | * | 4/2002 | Strom | 709/219 |
| 2002/0147820 | A1 | * | 10/2002 | Yokote | 709/229 |
| 2003/0166397 | A1 | * | 9/2003 | Aura | 455/410 |

FOREIGN PATENT DOCUMENTS

EP 0939571 A * 9/1999 ........... H04Q/11/00

* cited by examiner

Primary Examiner—Duc M. Nguyen (57) ABSTRACT

A fast authentication and access control method of authenticating a network access device to a communications network having an access point communicating with a remote authentication (home AAA) server for the network access device. The method includes the step of receiving an access request having an authentication credential from the network access device at the access point. The authentication credential includes a security certificate having a public key for the network access device and an expiration time. The security certificate is signed with a private key for the remote authentication server. The access point locally validates the authentication credential by accessing the public key of the remote authentication server from a local database, and checking the signature and expiration time of the security certificate. If the authentication credential is validated at the access point, the access point grants the network access device conditional access to the network by sending an access granted message to the network access device. The access granted message includes a session key encrypted with a public key for the network access device. The session key is stored in a database associated with the access point. The access point contacts the remote authentication server to check a revocation status of the security certificate for the network access device. If the access point receives a message from the remote authentication server that the authentication credential for the network access device has been revoked, it suspends network access for the network access device.

10 Claims, 6 Drawing Sheets

FAST AUTHENTICATION AND ACCESS CONTROL SYSTEM FOR MOBILE NETWORKING

This application claims priority to U.S. Provisional Appl. Ser. No. 60/290,776, entitled "An Authentication/Access Control Method for Fast Access and Fast Handoff," filed May 14, 2001, the content of which is incorporated by reference herein.

FIELD OF THE INVENTION

The present invention relates generally to mobile networking, and more particularly, to an authentication and access control system for reducing the time required for a mobile user to authenticate to a new communications network.

BACKGROUND

Figure 1:
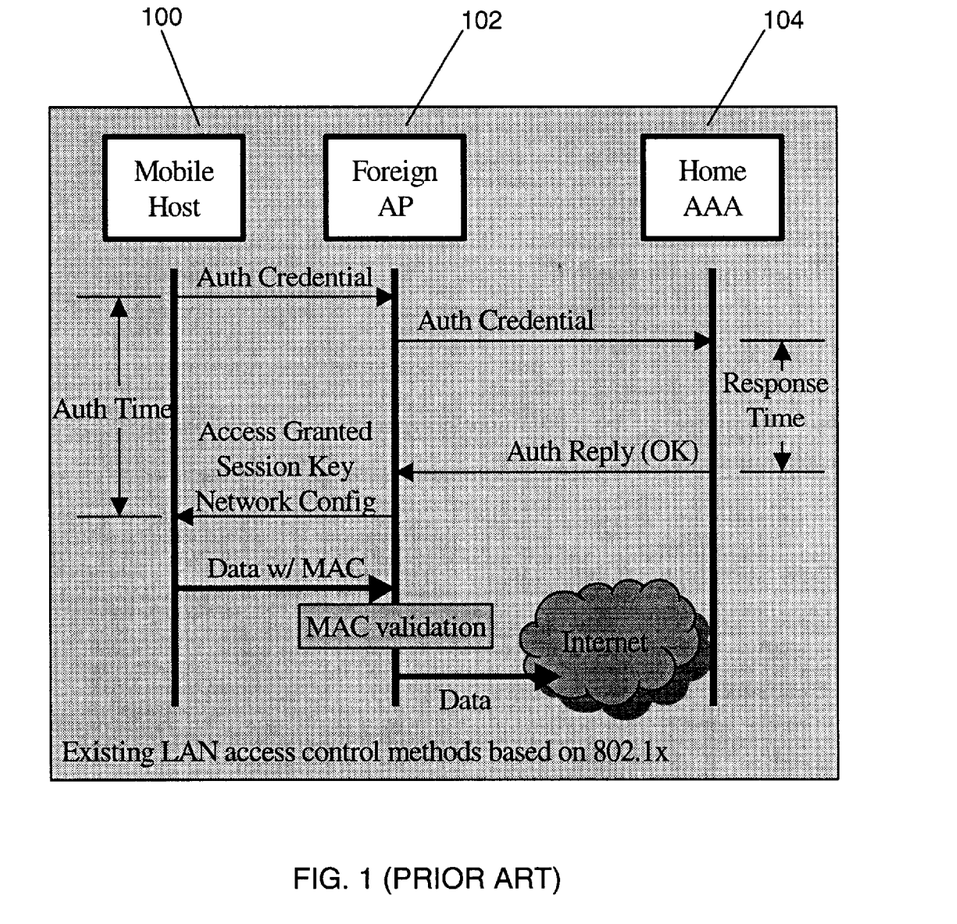
FIG. 1 is a schematic of a typical authentication process, such as that of an existing Local Area Network (LAN) access control method based on 802.1x.

A user having a network access device (mobile host), who moves from a location covered by the user's home network to another location covered by a foreign access network, can be characterized as "roaming" between networks. Typically, the complicated handoff procedure that enables the mobile host to gain access to the new network can cause QoS problems. When the mobile host moves from the coverage of one network and roams into the coverage of the new or "arriving" network, three basic actions occur to effectuate a handoff: (1) the mobile host authenticates to the arriving network; (2) the arriving network allocates resources for the mobile host; and (3) the departing network releases any resources allocated to the mobile host. When a mobile host authenticates to a foreign network that is under a different administration than the departing network, the authentication step can be relatively time consuming. A typical authentication scenario is illustrated in FIG. 1 for an existing Local Area Network (LAN) access control method based on the 802.1x standard. A mobile host 100 moves within the coverage of a foreign access network having a foreign access point (AP) 102. The AP 102 (or "base station" using cellular terminology) does not enable the mobile host 100 to access the new network until the mobile host has been authenticated by the mobile host's home AAA server 104. Since the mobile host 100 and the foreign AP 102 do not belong to the same network, the AP 102 cannot locally authenticate the mobile host 100. In these cases, the AP 102 forwards the mobile host's authentication credential to the home AAA server 104, and waits for an authentication response from the home AAA server 104. An authentication delay thus results equal to a sum of the round-trip transmission time for the authentication request/response messages to travel between the mobile host 100 and the home AAA server 104, and the authentication processing time at the home AAA server 104. These authentication delays can affect the QoS, particularly in the case of long-distance, multi-hop transmissions between the foreign AP 102 and the home AAA server 104. Moreover, the home AAA server 104 can become overloaded from frequent handoffs between different access networks, such as what typically occurs with Internet roaming. Frequent overloads of the home AAA server may result in the authentication request being placed into a queue for a long time, further exacerbating the delay for the mobile host to authenticate to the new access network.

SUMMARY OF THE INVENTION

In view of the above, it is an object of the present invention to provide a novel authentication/access control method that improves the handoff process for a mobile host that roams between networks.

It is another object of the present invention to reduce the authentication time for a mobile host to access a foreign network.

It is a further object of the invention to reduce the workload of remote authentication servers by offloading a portion of the authentication process for a network access device from the remote server to access points on the network.

In accordance with these and additional objects that will become apparent hereinafter, an aspect of the invention provides a system including an access point having a network interface for communicating with a remote authentication server on a communications network and a network interface for communicating with a network access device. The access point comprises a processor and a memory medium containing machine readable program instructions which, when executed by the processor, enable the access point to: validate an authentication credential contained in an access request received from the network access device. If the authentication credential is validated, the access point grants the network access device conditional access to the network, contacts the remote authentication server to verify a status of the authentication credential for the network access device; and suspends network access for the network access device in response to a message received from the remote authentication server that the authentication credential for the network access device has been revoked. Another aspect of the invention provides a remote authentication server having a processor and a memory medium containing machine readable program instructions which, when executed by the processor, enable the remote authentication server to determine the status of the authentication credential received in a query from the access point, to either confirm access to the network for the network access device or, if the authentication credential is revoked, send the access point a message to suspend access to the network for the network access device.

The present invention will now be described in detail with particular reference to the accompanying drawings.

DETAILED DESCRIPTION OF THE PREFERRED EMBODIMENT

Figure 2:
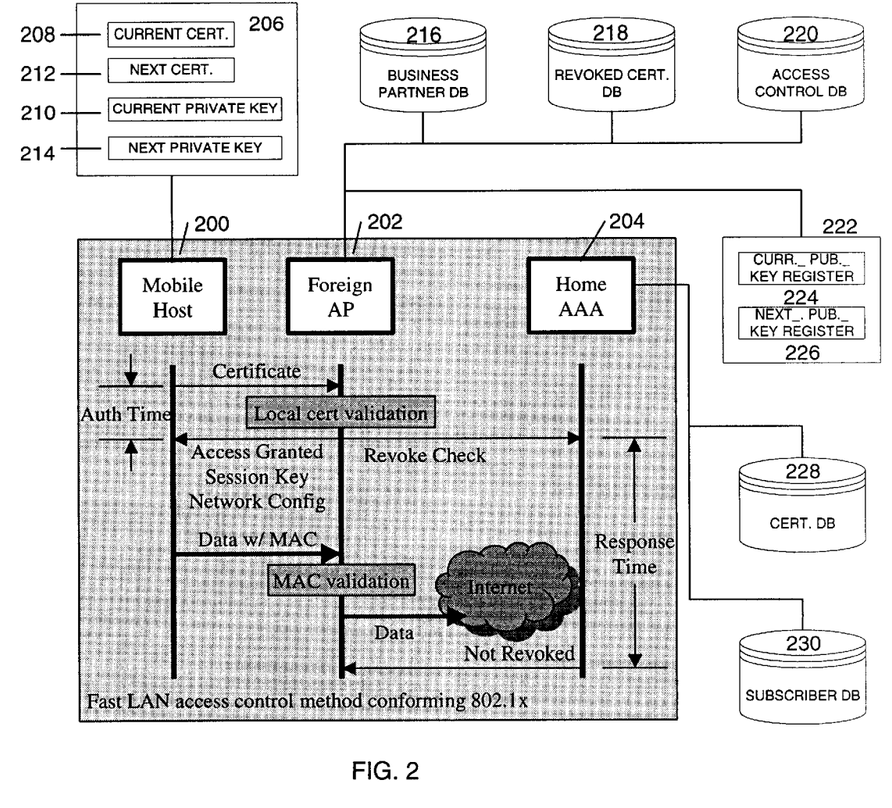
FIG. 2 is a schematic of a fast authentication access control method and architecture in accordance with the invention.

Referring now to the several views of the drawings, FIG. 2 is a schematic of a fast authentication access control method and architecture in accordance with the invention. Using this method, an access point (AP) can locally authenticate an arriving mobile with high confidence, and thus grant temporary access to the mobile host immediately after the successful completion of the local authentication process. The AP then forwards the submitted credentials to the mobile host's AAA server, which subsequently completes the entire authentication process. If a problem arises, the mobile host's temporary access is immediately suspended.

Referring to FIG. 2, there is depicted a schematic of a network access device (for simplicity, we refer to the device as a mobile host) 200 that is capable of obtaining network access via a foreign AP 202. Generally, the mobile host sends a security certificate to the foreign AP 202. The AP 202 includes the appropriate network interfaces for wireless communications with mobile hosts, and for communicating with a home AAA server 204. The home AAA server 204 also includes the appropriate network interface as is well known in the art. The AP 202 locally validates the certificate and will grant temporary network access to the mobile host 200 while querying the home AAA server 204 to determine if the certificate has been revoked before it expires. During this interim period, the mobile host 200 is temporarily enabled on the new access network, and thus can respectively send and receive packets to and from the network. Every packet is encrypted and signed using a session key as described in more detail below. If the certificate has been revoked for whatever reason, the home AAA server 204 contacts the foreign AP 202, which immediately destroys the corresponding session key from an access control database, and network access for the mobile host will be suspended.

The mobile host 200 includes memory 206 with a CURRENT_CERTIFICATE register 208, a CURRENT_PRIVATE_KEY register 210, a NEXT_CERTIFICATE register 212, and a NEXT_PRIVATE_KEY register 214. A current security certificate is stored in the CURRENT_CERTIFICATE register 208. A current private key is stored in the CURRENT_PRIVATE_KEY register 210. The specifics of these details are described in greater detail below.

The foreign AP 202 includes or is otherwise associated with a Business Partner Database 216, Revoked Certificate Database 218, and an Access Control Database 220. The Business Partner Database 216 contains the public keys for the mobile host's home AAA server 204. The Revoked Certificate Database 218 contains security certificates that have been revoked before expiration. The Access Control Database 220 stores session keys for the mobile host(s). The foreign AP 202 has memory 222 including a CURRENT_PUBLIC_KEY register 224 and a NEXT_PUBLIC_KEY register 226. The current public key of the home AAA server is stored in the CURRENT_PUBLIC_KEY register 224. These are all explained in greater detail hereinbelow.

The home AAA server 204 includes or is otherwise associated with a Certificate Database 228 and Subscriber Database 230. The Certificate Database 228 contains records that include parameters for the mobile user. The Subscriber Database 230 contains subscriber information for each mobile user that has an account with the network service provider.

Figure 3:
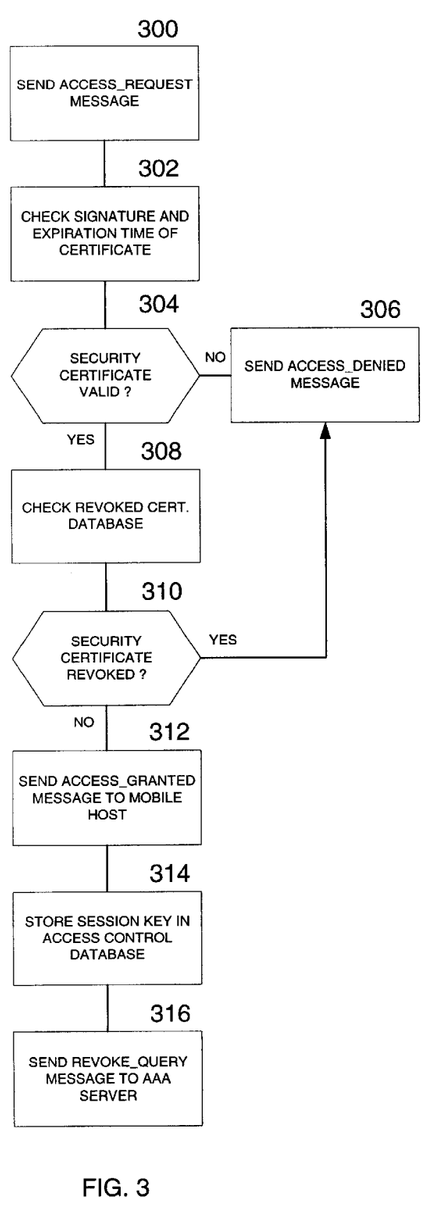
FIG. 3 is a flow diagram of a portion of the access control method.

Referring to FIG. 3, an illustrative authentication method in accordance with the invention comprises the following steps. The mobile host has arrived at the new network and seeks access (see FIG. 2). At 300, the mobile host sends an ACCESS_REQUEST message including its security certificate to the AP. The security certificate contains the mobile host's public key, denoted as $K_{MH\_PUB}$, and an expiration time. The certificate is signed by the home AAA server's private key, denoted as $K_{HAAA\_PRV}$.

At 302, after receiving the security certificate, the AP checks the signature and expiration time of the security certificate. The AP should have the public key of the mobile host's home AAA server, denoted as $K_{HAAA\_PUB}$ in the business partner database (216, FIG. 2). This is set up between the access network and the mobile host's home network via a business agreement as will be appreciated by those skilled in the art. At 304, if the AP determines that the security certificate is invalid, the AP denies the access request at 306 by replying to the mobile host with an ACCESS_DENIED message. Otherwise, at 308, the AP checks the revoked certificate database (218, FIG. 2), to determine whether the security certificate has been revoked before it was set to expire The content and structure of the database 218 is described in more detail hereinbelow. If it the certificate has been revoked, the AP denies the access request and sends an ACCESS_DENIED message to the mobile host at 306. Otherwise, the AP immediately grants temporary access to the mobile host at 312 by sending the mobile host an ACCESS_GRANTED message that includes a session key $K_{SN}$ encrypted using the mobile host's public key $K_{MH\_PUB}$, and other network configuration parameters (e.g., a local IP address assigned to the mobile host). At 314, the AP stores the session key in the access control database (220, FIG. 2). The session key can be indexed by the mobile host's IP address. At 316, the AP sends a REVOKE_QUERY message to the mobile host's home AAA server to check whether the security certificate has been revoked before it is set to expire.

Figure 4:
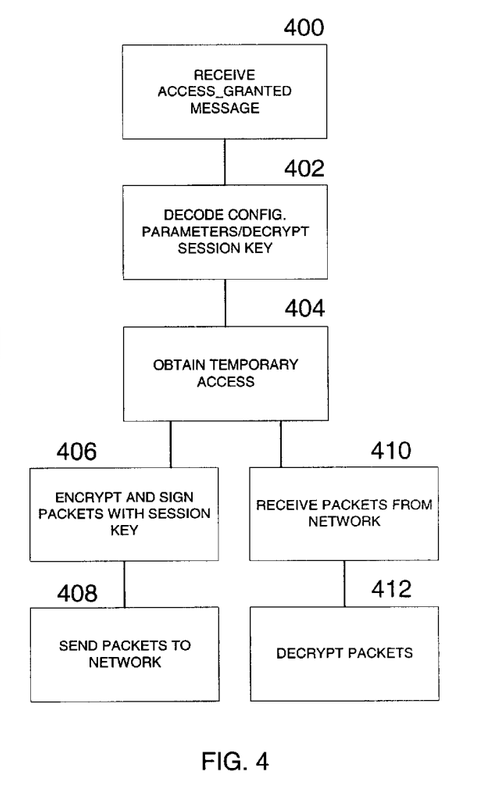
FIG. 4 is a flow diagram of a portion of the access control method.

Referring now to FIG. 4, the mobile host receives an ACCESS_GRANTED message from the AP at 400. At 402, the mobile host decodes the network configuration parameters, self-configures, and decrypts the session key $K_{SN}$ using its own private key $K_{MH\_PRV}$ (210, FIG. 2) that is stored in memory. The mobile host is now temporarily enabled on the new access network at 404, and thus can begin sending packets to the network, and can expect to receive packets from the network. In the exemplary embodiment, every packet is encrypted and signed using the session $K_{SN}$. Accordingly, packets will have the form of "Header || $K_{SN}$(Payload) || Hash ($K_{SN}$ || Hash (Header || Payload))", where "||" denotes a cascade operator, and Hash( ) represents a one-way function such as MD5 or SHA. These encryption techniques are well known in the art and therefore need not be discussed in detail here. For data sent from the mobile host to the network, the mobile host encrypts and signs packets at 406 and sends the encrypted packets to the AP at 408. The AP decrypts and verifies the packets. Similarly, the AP encrypts packets destined for the mobile host. The encrypted packets are received by the mobile host at 410, which then decrypts and verifies the packets at 412.

Figure 5A:
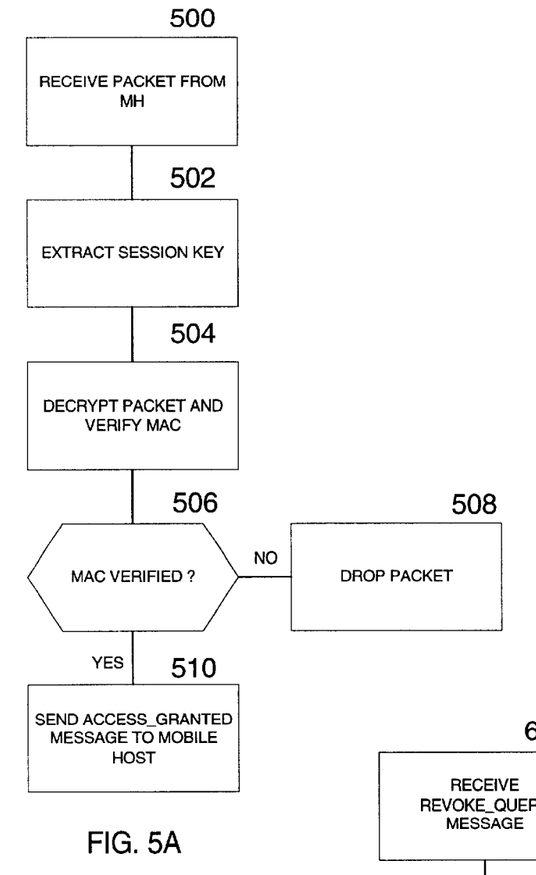
FIGS. 5A and 5B are flow diagrams of portions of the access control method.

Referring now to FIG. 5A, there are depicted the actions of the AP when it receives packets from the mobile host that are routed to the network. At 500, the AP receives a packet from the mobile host. The AP uses the packet's source address as an index to extract the session key $K_{SN}$ from the access control database at 502. At 504, the AP decrypts the packet and verifies the MAC (message authentication code) of the packet. At 506, if the MAC cannot be verified, the packet is silently dropped at 508. If the MAC is verified, the AP routes the unencrypted packet to its destination address at 510.

Figure 5B:
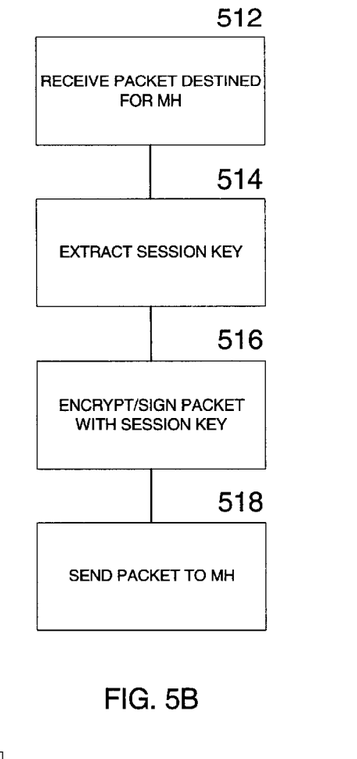

FIG. 5B depicts the actions by the AP when it receives a packet destined for the mobile host at 512. At 514, the AP uses the packet's destination address as an index to extract the session key $K_{SN}$ from its access control database. At 516, the AP encrypts and signs the packet using $K_{SN}$. The encrypted packet is then sent to the mobile host at 518.

Figure 6:
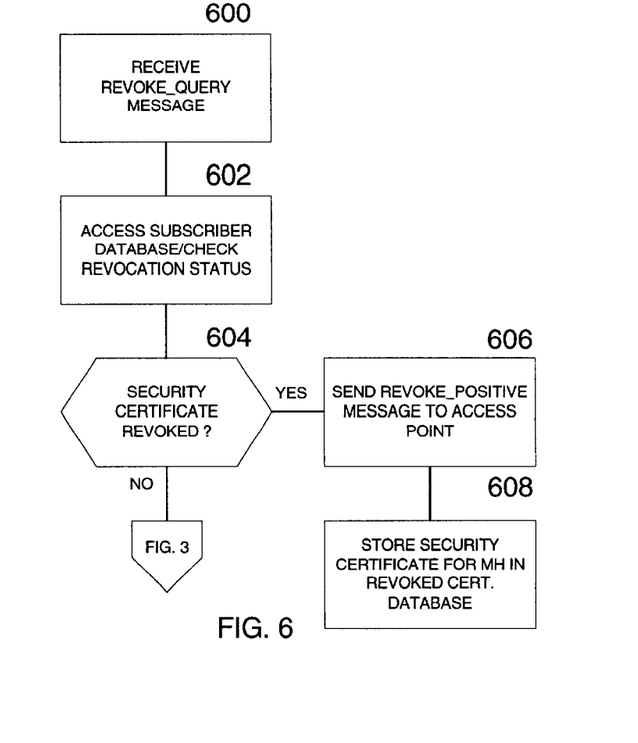
FIG. 6 is a flow diagram of a portion of the access control method.

Referring now to FIG. 6, the mobile host's home AAA server receives the REVOKE_QUERY message at 600. At 602, the AAA server accesses its subscriber database (230, FIG. 2) to determine if the mobile host's security certificate has been revoked. If the certificate has been revoked at 604, a REVOKE_POSITIVE message is sent to the AP at 606. The AP is configured to immediately destroy the corresponding $K_{SN}$ from its access control database (thereby suspending the mobile host's access to the network). At 608, the AP then stores the mobile host's security certificate in the revoked certificate database. The revoked certificate database will store this certificate till it expires. If there is no empty memory in the revoked certificate database, the AP will adopt an FIFO (first in first out) strategy to update the content of this database.

The details of authentication/access control, and key management are shown and described hereinafter. Authentication and access control can be implemented at either layer 2 or layer 3 of the OSI network model. With regard to layer 2, the AP handles authentication and access control issues based on link layer data frames. Every data frame has the form of "Frame Header || $K_{SN}$(Frame Payload) || Hash ($K_{SN}$ || Hash (Frame Header || Frame Payload))". In a layer 3 implementation, an access gateway sitting behind the access points handles authentication and access control issues based on network layer data packets, such as IP packets. In this case, every packet has the form of "Packet Header || $K_{SN}$(Packet Payload) || Hash ($K_{SN}$ || Hash (Packet Header || Packet Payload))", and the AP may need to handle access control issues by snooping network layer packets.

Tasks associated with key management include updating the security certificates for individual mobile users, and public/private keys for the respective home AAA servers. It will be understood that security certificates for individual mobile users require more frequent updates than the public/private keys for the home AAA server. To simplify key management, the expiration time for the home AAA server's public/private keys should be synchronized with the expiration time of all security certificates issued by the home AAA server. Accordingly, the life cycle for a public-private key pair for the home AAA server can be represented as an integer times of the life cycle of any security certificates.

The security certificate for a mobile user can be updated using mutual authentication between the mobile host and its home AAA server. To assure acceptable future secrecy, an updating session can utilize a method such that disclosed in U.S. patent application Ser. No. 60/338,922, entitled "A General Method To Establish A Secure Connection For Off-The-Record Communications," filed Dec. 10, 2001. In accordance with this implementation, the disclosure of a private key for a previous, expired security certificate doesn't compromise the private key for a current security certificate.

To demonstrate an illustrative protocol, the following assumptions are made for a mobile host and the host's home AAA server.

1. At time $t_0$, a security certificate for a mobile user becomes effective, and at time $t_0+T$, the security certificate expires.
2. The mobile host knows the host name or IP address of its home AAA server based on its configuration parameters.
3. The mobile host has a CURRENT_CERTIFICATE register, a CURRENT_PRIVATE_KEY register, a NEXT_CERTIFICATE register, and a NEXT_PRIVATE_KEY register (see FIG. 2). The current security certificate is stored in the CURRENT_CERTIFICATE register. The current private key is stored in the CURRENT_PRIVATE_KEY register. At time to, the NEXT_CERTIFICATE register and the NEXT_PRIVATE_KEY register are initialized to zero.
4. The home AAA server to generate security certificates and corresponding private keys. Alternatively, the mobile hosts can generate these keys assuming sufficient computing power.
5. The home AAA server has a certificate database. Each record in the database includes the following parameters for a mobile user: current security certificate, next certificate, next private key, and a revoke flag.

Figure 7:
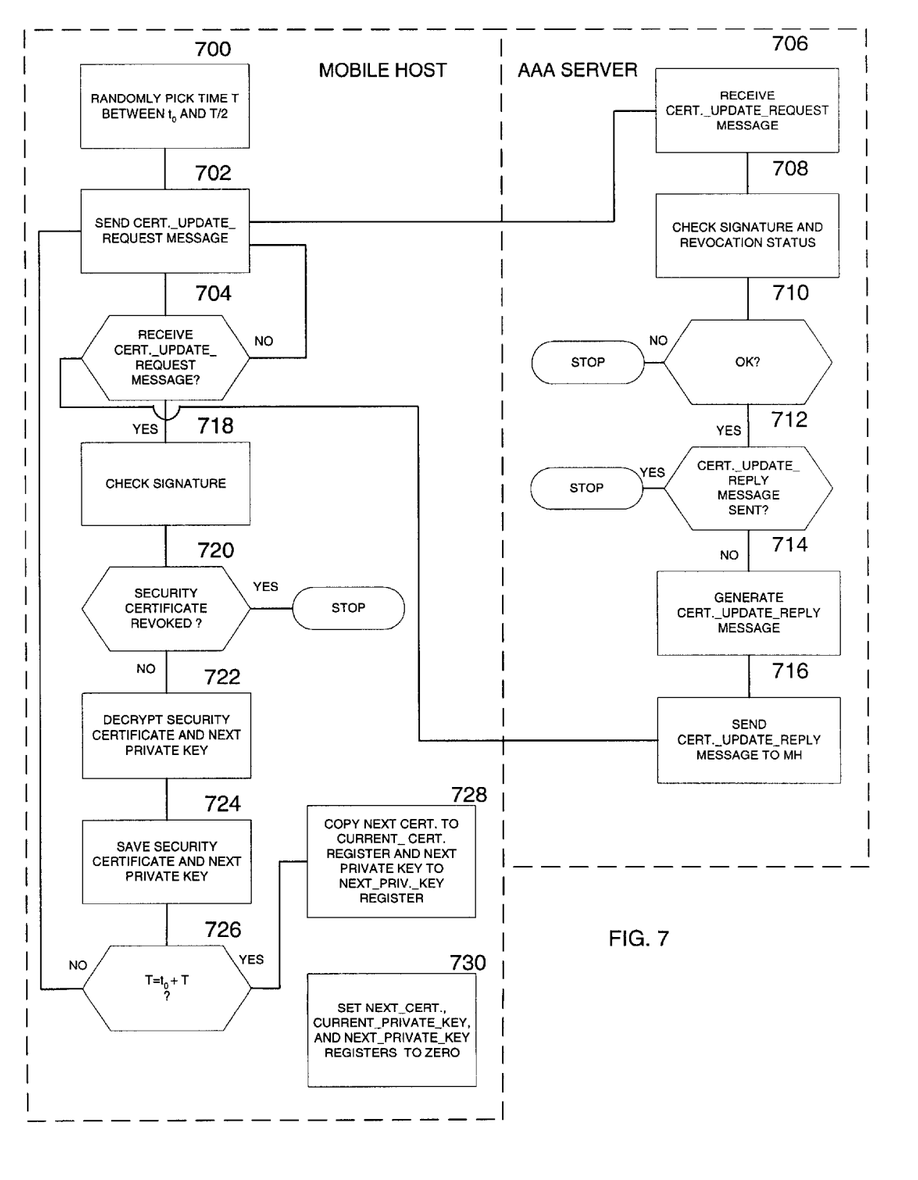
FIG. 7 is a flow diagram of a portion of the access control method.

Referring now to FIG. 7, a security certificate is updated automatically in accordance with the exemplary protocol. At 700, the mobile host randomly picks a time between $t_0$ and $t_0+T/2$. This prevents all mobile hosts initiating the process with the home AAA server simultaneously to update their security certificates (otherwise, the home AAA server may be overloaded because the key generation algorithm is computationally intensive). At 702, the mobile host generates a random number x, calculates $X=p^x \mod q$ (where p and q are Diffie-Hellman parameters), and sends a CERTIFICATE_UPDATE_REQUEST message to the home AAA server. The message contains a current security certificate issued by the home AAA server and Diffie-Hellman parameters X, p, and q. The entire message is signed using current private key of the mobile user, such that the home AAA server can verify that the mobile host was the origin of the message. At 704, if a CERTIFICATE_UPDATE_REPLY message has not been received, the mobile host repeats step 702 at specified time intervals until the message is received (indicating success), or the current security certificate expires (indicating failure).

At 706, the CERTIFICATE_UPDATE_REQUEST message is received by the home AAA server. At 708, the home AAA server checks the signature of the security certificate in the message, and checks to see whether the security certificate has been revoked. At 710, if either the signature is not verified or the certificate has been revoked, the process fails. At 712, if the signature is verified and the certificate has not been revoked, and a CERTIFICATE_UPDATE_REPLY message has not been sent to the mobile host, the home AAA server at 714 either retrieves the next security certificate and the next private key from the certificate database, or generates them for the mobile host (effective from $t_0+T$ to $t_0+2T$). The home AAA server casts a random number y, calculates $Y=p^y \mod q$ and $K=y^X \mod q$, and encrypts the new security certificate and corresponding private key using K as the key. At 716, this encrypted message is sent to the mobile host in the form of a CERTIFICATE_UPDATE_REPLY. This message contains the encrypted next security certificate, the encrypted next private key and the Diffie-Hellman parameters Y, p, and q. The entire message is signed using the current private key of the home AAA server. This enables the mobile host to verify that this message was sent from the home AAA server.

After receipt of the CERTIFICATE_UPDATE_REPLY message, at 718 the mobile host first checks the signature of the message. If the signature is verified at 720, the mobile host calculates $K=x^Y \mod q$, decrypts the next security certificate and the next private key using K as the key at 722, and saves them in the NEXT_CERTIFICATE register and the NEXT_PRIVATE_KEY register respectively at 724.

If the clock reaches $t_0+T$ at 726, the mobile host copies the next security certificate from the NEXT_CERTIFICATE register to the CURRENT_CERTIFICATE register at 728, then sets the NEXT_CERTIFICATE register to zero at 730. The same procedure is implemented with the CURRENT_PRIVATE_KEY register and the NEXT_PRIVATE_KEY register. At the same time, the home AAA server will update its certificate database accordingly. It is unnecessary for the clocks to be precisely synchronized between the mobile host and the home AAA server. From $t_0+T-\Delta t$ to $t_0+T+\Delta t$, both security certificates are honored.

To update public and private keys for a home AAA server, the home AAA server only needs to be authenticated to the APs and therefore encryption is unnecessary. The home AAA server distributes new public keys that are adopted by the home AAA server to the various APs.

For the purpose of illustration herein, the following are assumed for a home AAA server and an AP:
1. A public/private key pair for the home AAA server becomes effective at time $t_0$, and expires at $t_0+T$.
2. The AP knows the host name or IP address of the home AAA server based on its configuration parameters.
3. The AP has a CURRENT_PUBLIC_KEY register (222, FIG. 2) and a NEXT_PUBLIC_KEY register 226. The current public key of the home AAA server is stored in the CURRENT_PUBLIC_KEY register. At time $t_0$, the NEXT_PUBLIC_KEY register is initialized to zero.

Figure 8:
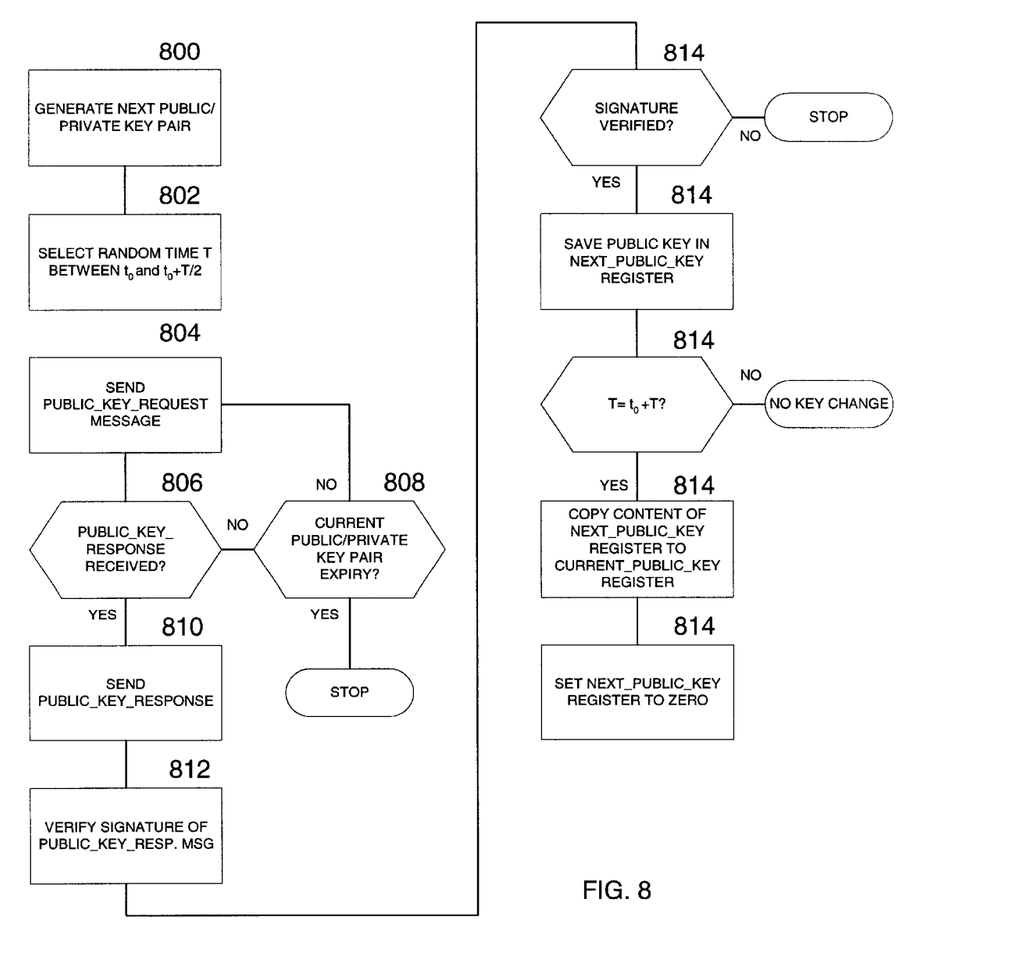
FIG. 8 is a flow diagram of a portion of the access control method.

An illustrative protocol is depicted in FIG. 8, which shows how to update this information automatically.

At time $t_0$, the home AAA server generates the next public/private key pair for itself at step 800. These key pair are effective during $[t_0+T, t_0+2T]$. At 802, the AP randomly picks a time between $t_0$ and $t_0+T/2$ and requests the next public key from the home AAA server (this prevents multiple APs from making simultaneous requests to the home AAA server). At 804, the AP sends a PUBLIC_KEY_REQUEST message to the home AAA server. If a PUBLIC_KEY_RESPONSE message is not received at 806, the AP will repeatedly send the PUBLIC_KEY_ACCESS request message at a sparse cycle until the corresponding PUBLIC_KEY_RESPONSE message is received (which means success) or at 808 the current public/private key pair for the home AAA server expires (which means failure).

After receiving the PUBLIC_KEY_REQUEST message, at 810 the home AAA server replies with a PUBLIC_KEY_RESPONSE message to the AP. This message contains the next public key to be used. The message is signed using current private key of the home AAA server, so that the AP is convinced that the message indeed originated from the home AAA server. The AP checks the signature of the PUBLIC_KEY_RESPONSE message at 812. If the signature is verified at 814, the AP saves the public key in the NEXT_PUBLIC_KEY register at 816. At 818, if the clock has reached $t_0+T$, the AP copies the content of the NEXT_PUBLIC_KEY register to the CURRENT_PUBLIC_KEY register at 820, and sets the NEXT_PUBLIC_KEY register to zero at 822. Concurrently, the home AAA server starts using the new public/private key pair and destroys the old key pair. As discussed above with respect to the mobile host, it is unnecessary for the clocks between the home AAA server and AP to be precisely synchronized from $t_0+T-\Delta t$ to $t_0+T+\Delta t$ since both public keys are honored.

The present invention has been shown and described in what are considered to be the most practical and preferred embodiments. It his anticipated, however, that departures may be made therefrom and that obvious modifications will be implemented by those skilled in the art.

We claim:
1. An access point having a network interface for communicating with a remote authentication server on a communications network and a network interface for communicating with a network access device, the access point comprising:
   a processor and a memory medium containing machine readable program instructions which, when executed by the processor, enable the access point to:
   validate an authentication credential contained in an access request received from the network access device;
   if the authentication credential is validated, grant the network access device conditional access to the network;
   contact the remote authentication server to verify a status of the authentication credential for the network access device; and
   suspend network access for the network access device in response to a message received from the remote authentication server that the authentication credential for the network access device has been revoked.

2. The access point recited in claim 1, wherein the authentication credential for the network access device includes a security certificate.

3. The access point recited in claim 2, wherein the security certificate includes a public key for the network access device and an expiration time, and the security certificate is signed with a private key for the remote authentication server.

4. The access point recited in claim 3, wherein the access point locally validates the network access device by: accessing a public key of the remote authentication server from a database, and checking the signature and expiration time of the security certificate.

5. The access point recited in claim 4, wherein the access point grants conditional access to the network access device by encrypting a session key with a public key for the network access device, and sending an access granted message to the network access device with the encrypted session key; and storing the session key in a database.

6. The access point recited in claim 4, wherein the access point sends a request to the remote authentication server to check the revocation status of the security certificate for the network access device.

7. The access point recited in claim 4, wherein the access point suspends network access for the network access device by destroying the session key.

8. An access point having a network interface for communicating with a remote authentication server on a communications network and a network interface for communicating with a network access device, the access point comprising:
   a processor and a memory medium containing machine readable program instructions which, when executed by the processor, enable the access point to:
   validate an authentication credential received from the network access device, the authentication credential comprising a security certificate including a public key for the network access device and an expiration time, the security certificate being signed with a private key for the remote authentication server; by accessing the public key of the remote authentication server from a database, and checking the signature and expiration time of the security certificate;
   grant the network access device conditional access to the network by sending an access granted message to the network access device, the access granted message including a session key encrypted with a public key for the network access device;

store the session key in a database;

contact the remote authentication server to check a revocation status of the security certificate for the network access device; and suspend network access for the network access device in response to a message received from the remote authentication server that the authentication credential for the network access device has been revoked, by destroying the session key for the network access device.

9. A remote authentication server having a network interface for communicating over a network with an access point that enables a network access device to communicate with the network, where the access point is capable of receiving an access request including an authentication credential from the network access device at the access point and locally validating the authentication credential at the access point to grant the network access device conditional access to the network, the remote authentication server comprising:

a processor and a memory medium containing machine readable program instructions which, when executed by the processor, enable the remote authentication server to determine the status of the authentication credential received in a query from the access point, to either confirm access to the network for the network access device or, if the authentication credential is revoked, send the access point a message to suspend access to the network for the network access device.

10. The remote authentication server recited in claim 9, wherein the machine readable program instructions which, when executed by the processor, enable the remote authentication server to check a subscriber database containing the security certificate to determine whether the certificate is valid.

* * * * *